United States Patent [19]
Storace

[11] Patent Number: 4,864,506
[45] Date of Patent: Sep. 5, 1989

[54] POSTAGE METER RECHARGING SYSTEM

[75] Inventor: Anthony Storace, Norwalk, Conn.

[73] Assignee: Pitney Bowes Inc., Stamford, Conn.

[21] Appl. No.: 850,479

[22] Filed: Apr. 10, 1986

[51] Int. Cl.[4] .............................................. G06F 15/20
[52] U.S. Cl. ................................ 364/464.02; 235/381
[58] Field of Search ............... 364/464, 466, 200, 900, 364/464.02; 235/101, 381

[56] References Cited

U.S. PATENT DOCUMENTS

| | | | |
|---|---|---|---|
| 3,705,384 | 12/1972 | Wahlberg | 235/381 X |
| 3,956,615 | 5/1976 | Anderson et al. | 235/381 X |
| 4,652,998 | 3/1987 | Roza et al. | 364/900 X |
| 4,670,886 | 6/1987 | Newcombe, Jr. et al. | 178/70 R X |

*Primary Examiner*—Parshotam S. Lall
*Assistant Examiner*—Edward R. Cosimano
*Attorney, Agent, or Firm*—Michael J. DeSha; David E. Pitchenik; Melvin J. Scolnick

[57] ABSTRACT

A recharging system for a postage meter includes automatic telephone communication with a remote accounting center which utilizes touch-tone (DTMF) signals on the postage meter users telephone line to enable automatic recrediting of the descending register of the postage meter whenever the amount remaining in the register reaches a predetermined threshold. The meter further includes a clock which may be synchronized with a clock at the remote accounting center to enable the meter to answer at a predetermined time a call initiated by the remote accounting center. The postage meter user's funding account may be maintained at a bank instead of the remote accounting center but the funds transfer accounting takes place at the remote accounting center.

20 Claims, 6 Drawing Sheets

REMOTE ACCOUNTING ROUTINE

POSTAGE METER RECHARGING SYSTEM

FIELD OF THE APPLICATION

The present invention relates to a postage meter recharging system and to a postage meter adapted for such recharging.

BACKGROUND OF THE INVENTION

Postage meter devices have found wide application in many businesses. The device prints a standard unit of value for governmental or private carrier delivery of parcels and mail. It is understood that the term "postage meter" also includes other like devices which provide a unit value metering capability.

One of the chief disadvantages of the postage meter devices as they are utilized today is the problem of recharging the postage meter with funds to be metered. At present, postal regulations require that the funds be prepaid before metering commences. This requirement results in a postage meter either being physically taken to a post office facility for recrediting or there being means for obtaining a remote recrediting of the meter device.

Various schemes have been devised and implemented to obtain the desired remote recrediting based on information from a remote accounting station. Typical configurations are shown in U.S. Pat. No. 3,792,446 to McFiggans, et. al. entitled "REMOTE POSTAGE METER RESETTING METHOD" and in U.S. Pat. No. 4,097,923 to Eckert, Jr., et. al. entitled "REMOTE POSTAGE METER CHARGING SYSTEM USING AN ADVANCED MICROCOMPUTERIZED POSTAGE METER." These patents teach a data center which is equipped with a programmed digital computer and a voice answer-back unit to process telephone calls from users of postage meters equipped either with a combination lock such that the lock prohibits recharging of the associated meter until it is unlocked or in the case of U.S. Pat. No. 4,097,923 of a working memory which contains a seed number for generating postage funding combinations to unlock the meter. The remote system of the latter patent includes the capability of adding variable amounts of postage to the postage meter. The teaching of U.S. Pat. No. 3,792,446 relates only to the addition of a fixed increment to the meter.

U.S. Pat. No. 3,255,439 to Simjian discloses a system in which the meter communicates directly to a central accounting station for accounting for each and all of the metering operations either on a real time basis or in batches. Similar systems are disclosed for instance in West German Patent Application No. DE 2636852 published Feb. 23, 1978 in which a data transmitting unit is employed to recharge the postage meter by way of telephone or telegraph lines. U.K. Application 2,147,853 published May 22, 1985 further discloses a telephone integrated with a mail franking device which will operate as either a telephone or a postage meter. The telephone key pad may be used to set postal values and it is disclosed that the accounting may be done either in the device or in a central accounting unit.

Each of the devices is limited in that there are required a number of complex operations in order for the user of the postage meter to assure that there are funds in his meter to be dispensed. That is in every case in the known postage meters, where the meter funds are required to be updated, it is up to the user to realize that the funds in the meter are low and that he should initiate a telephone call or take the meter to the Post Office in order to recredit the meter. In many cases, a low funds event may occur as the user is in the midst of a mailing run. Because the prior art devices typically have a lockout feature to prevent meter operation when the funds get too low, the user is unable to continue with his postage metering operations. In such cases, the user experiences dissatisfaction because one of the reasons for utilizing the remote recharging features of the postage meter is to eliminate his problems in having to go to the post office and to be able to obtain his postage as needed it.

SUMMARY OF THE INVENTION

In accordance with the invention, a postage meter monitors the funds remaining in its descending register and whenever the value reaches a predetermined level, an automatic dialing device establishes communication to initiate a funds transfer. An account corresponding to the postage meter is maintained at a remote accounting center or at a bank. Once communication to the remote accounting center is established, the account of the postage meter user is verified to assure that sufficient funds are available for transfer to the postage meter. In the event that the account is verified as proper, a signal, preferably recrediting data encrypted to prevent fraud, is transmitted to the postage meter to update the credit register. Preferably, the predetermined threshold is selectable by the user to match his expected use of postage. For best results, the meter stores the signal indicating the necessity for recrediting of the register and communicates during an offpeak period such as nighttime when the cost of telephone communication are lower and when the data center can be expected to encounter much less demand on its facilities. The calls from various postage meters may be staggered in order to avoid overloading the system.

Preferably, the communications are established through a telephone exchange utilizing dual tone multifrequency generators and receivers for decoding the data communicated between the meter and remote accounting center. It will be understood that conventional communication through MODEM connections are also contemplated. For best results, the data is encrypted in both directions in order to block fraudulent attempts to recredit the registers.

In a further feature in accordance with the invention, means may be specifically provided in order to enable synchronization between the clock of the remote accounting center and the postage meter to enable the remote accounting center to initiate communications with postage meter. The meter will answer a ring signal only at predetermined times set and synchronized between the computer at the remote accounting center and the postage meter. If the telephone connection can not be made because the meter telephone line is busy, the computer can attempt to establish communication at a predetermined time thereafter at which time the meter will also answer the ring signal.

It is therefore an object of the invention to provide a postage meter recharging system that is transparent to the postage meter user.

It is a further object to provide a postage meter recharging system which will provide communication with the remote accounting center at a lower cost to the postage meter user and at a predetermined level of funds in the meter, preferably selectable by the user.

It is yet a further object to provide a postage meter recharging system in which the funds may be maintained in an interest bearing account prior to transfer to the remote accounting center and crediting to the postage meter user.

DESCRIPTION OF THE DRAWING

In order that the invention will be more clearly understood, it will now be disclosed in greater detail with reference to the accompanying drawings wherein.

DESCRIPTION OF THE PREFERRED EMBODIMENT

Figure 1:
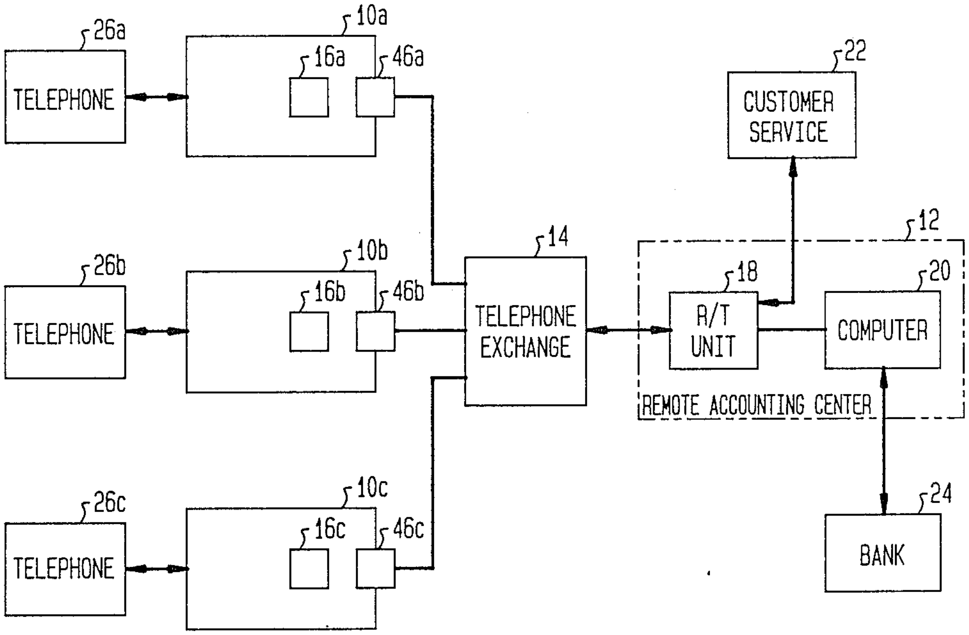
FIG. 1 is a block diagram of a postage meter recharging system in accordance with the invention.

Referring now to FIG. 1, a schematic block diagram of the remote meter funding system of this invention is shown. A plurality of blocks (10*a*, 10*b*, 10*c*) represent postage meter stations capable of communicating with a data center or remote accounting station represented by block 12. The postage meter stations communicate with remote accounting center 12 via telephone exchange equipment generally illustrated by block 14. The transmitter-receiver (16*a*, 16*b*, 16*c*) at each station (10*a*, 10*b*, 10*c*) is preferably a DTMF generator-receiver combination such as for example, Motorola MC 14410 DTMF Generator and GTE G8870A DTMF Receiver connected to output port (46*a*, 46*b*, 46*c*).

Remote accounting center 12 includes a similar generator-receiver shown at 18. This generator-receiver 18 will receive frequency encoded data input from the transmitter-receiver combination (16*a*, 16*b*, 16*c*) at any of the stations (10*a*, 10*b*, 10*c*) and transform this input into a suitable machine language for a programmed or special purpose digital computer 20. The computer 20 may be, for example, a Data General "Nova". The computer in turn communicates back to the particular postage meter station (10*a*, 10*b*, 10*c*) via the communication line established by the telephone exchange equipment. It will be appreciated that communication between each postage meter station and the remote accounting center could, alternatively, be by way of a MODEM as is well known in the art of computer communication.

The data center 12 is shown in conjunction with a customer service facility 22 for providing human communication, if required, to the user of the postage meter station (10*a*, 10*b*, 10*c*) in order to provide help or information. In one embodiment of the charging system in accordance with the invention, the data center 12 may be in communication with a remote banking facility 24 to provide a funds transfer between an account maintained at the banking facility 24 and the remote accounting center 12. Typically, the postal meter station (10*a*, 10*b*, 10*c*) will be used in conjunction with a conventional telephone handset (26*a*, 26*b*, 26*c*) coupled thereto.

Figure 2:
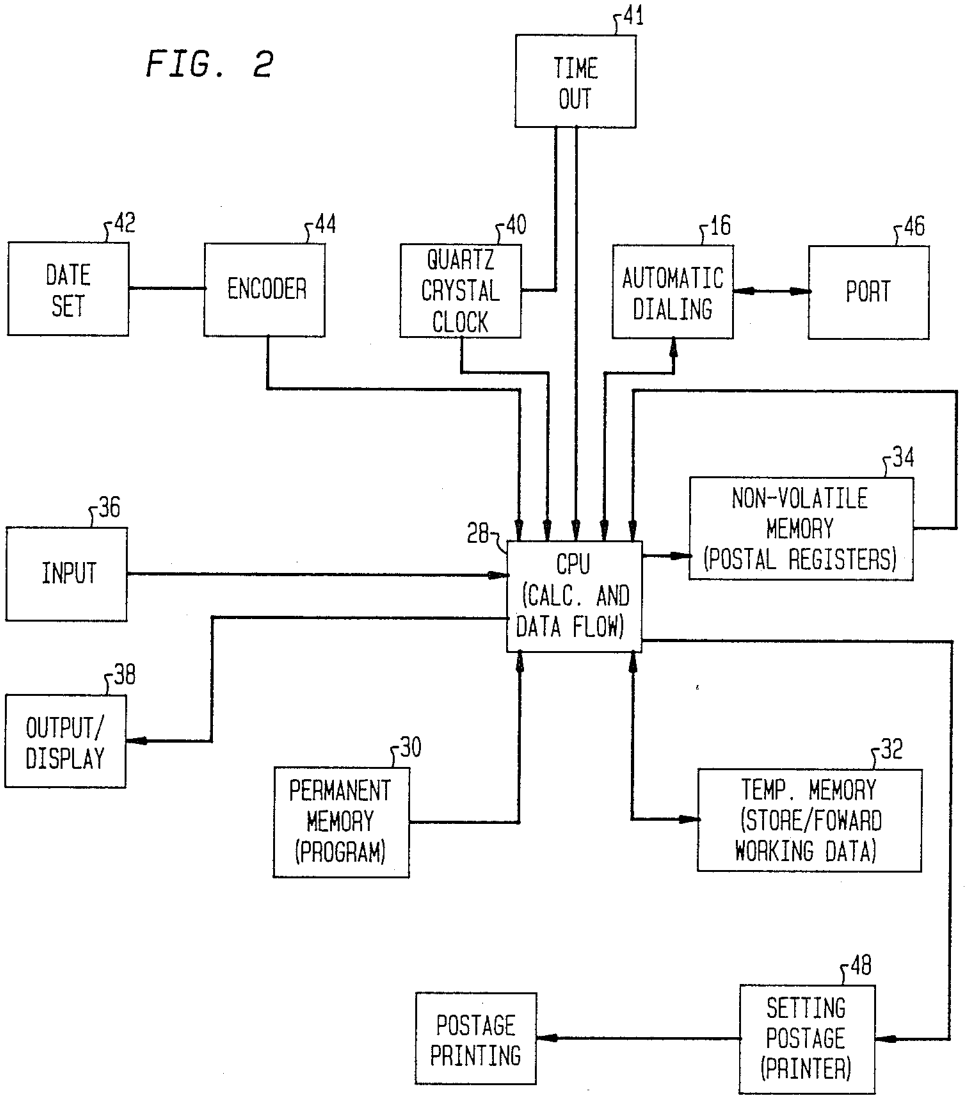
FIG. 2 is a block diagram of a postage meter in accordance with the invention.

Referring now to FIG. 2, the general functional arrangement of the computerized postage meter station 10 of the present invention is illustrated.

Electronic postage meters are known and are described, for instance, in U.S. Pat. No. 3,978,457 for MICROCOMPUTERIZED ELECTRONIC POSTAGE METER SYSTEM and in U.S. Pat. No. 4,301,507 for ELECTRONIC POSTAGE METER HAVING PLURAL COMPUTING SYSTEMS, the disclosures of which are specifically incorporated by reference herein.

The heart of the system is the CPU or microprocessor 28 and it performs the basic functions of performance of calculations based on input data and controlling the flow of data between various memory units in addition to controlling the printing operations.

Three basic memory units are employed with the CPU 28. The first is the ROM or permanent memory 30 which as is well known is a non-alterable memory storing the specific sequence of operations for performing postal data calculations in accordance with certain predetermined inputs as well as performing other routines for operating the system. The second memory unit is a temporary memory, RAM 32 which interacts with the CPU 28 for forming a temporary storage, holding and forwarding working data in accordance with the calculations being performed by the CPU 28. An additional memory component, NVM 34 which may be a battery backed RAM or other memory capable of long term storage of data is also coupled to the CPU 28. It will be understood that the data calculation may be performed and stored in battery backed RAM or an appropriate NVM of other known types. The NVM 34 is a nonvolatile memory which acts to store certain critical information employed in the postal system. Information stored in the temporary memory 32 which represents crucial accounting functions such as descending balances in a descending register or ascending credits in an ascending register and the like are stored in the nonvolatile memory 34 wherein they may be held while the machine is de-energized and then recalled upon a subsequent start-up. In this manner, the computer system may continually act upon these balances in the temporary memory 32 without fear or loss of this information upon shut-down. Further, the information may be recalled on reactivation by start-up by retrieving it from the nonvolatile memory 34. The nonvolatile memory is shown as coupled to the CPU and deriving an output therefrom in accordance with the transfer of information from the temporary storage 32 under the control of the permanent memory 30 through the CPU 28. The nonvolatile memory 34 is also shown as providing an output line coupled back into the CPU 28 for transferring the data back into and through the CPU 28 and into the temporary memory 32 in accordance with the start-up routine under the control of the permanent memory 30.

The system operates in accordance with data applied from an appropriate input means 36. It will be appreciated that the input means may include mechanical print value setting devices and switches in place of or in addition to a keypad. This data is fed into the CPU 28 under control of the program in the permanent memory 30. At any time during the operation of the system, the contents of the temporary memory 32 storing the appropriate credit, debit, balances, or other accumulations in accordance with the various features of the system could be made available by an appropriate instruction provided by the input means 36 or communicated to the meter which causes the CPU 28 to access the desired location temporary memory 32 storing the information requested. The information may also be provided through the CPU 28 into the output display unit 38.

Further in accordance with the invention, there is shown a clock 40 connected to the CPU for the purpose of providing time and date information to the CPU. Such clocks are well known and may comprise for instance an LSI logic circuit in combination with a quartz-crystal controlled oscillator. The dater wheels indicated at 42, which are typically positioned manually, have encoders 44 coupled thereto which provide date wheel positioning information to the CPU. A suitable arrangement is shown for example in U.S. Pat. No. 4,060,720 to Check specifically incorporated by reference herein.

A timeout device 41 is coupled to the clock 40 and the CPU 28. The timeout device operates to measure the time during which the meter is without power.

As previously described with respect to FIG. 1, a DTMF Transmitter and Receiver combination 16 is coupled to the CPU and to an output port 46 for establishing communication and for communications between the remote accounting center and the CPU under the control of the CPU or the remote accounting center.

Under control of the CPU, when appropriate postal data information is provided, the postage setting device 48 will enable postage printing device 49. Details of suitable apparatus are described for instance in U.S. Pat. No. 3,978,457 previously incorporated by reference.

Figure 3:
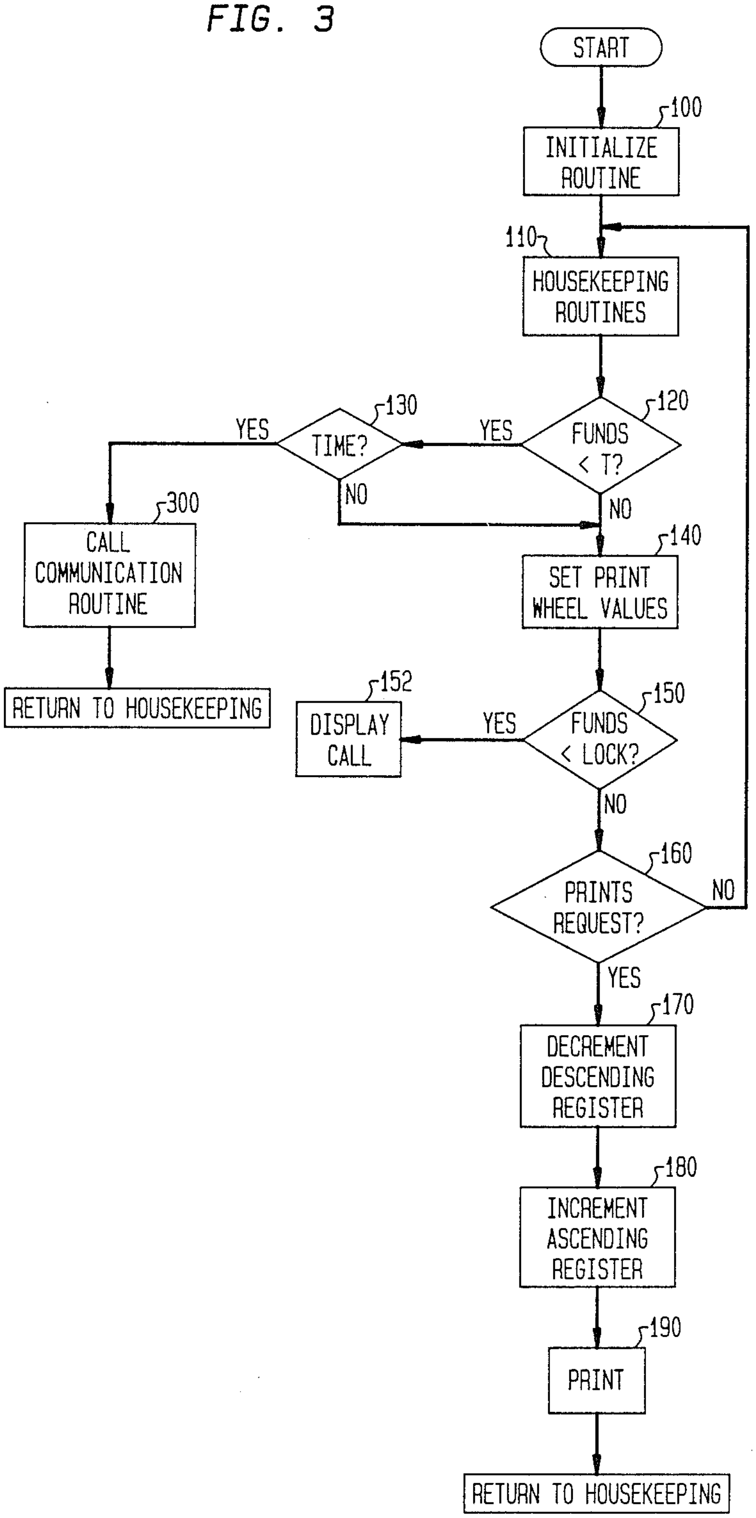
FIG. 3 is a flow chart of the operation of the postage meter.

FIG. 3 illustrates in a flow chart the operation of a postage meter in accordance with the invention. Once the postage meter station 10 is installed, the meter program proceeds through its initializing routines shown at block 100. Thereafter as described more fully below the meter will continuously loop through its routines to check meter parameters and input conditions and to print postage as desired by the user.

As shown in block 110 the meter program proceeds through housekeeping routines such as those described for instance in U.S. Pat. No. 4,301,507 previously incorporated by reference for monitoring various meter conditions. The routine then proceeds to decision block 120 to check whether the funds in the decreasing register have been decremented to a predetermined threshold level. Preferably this threshold level is set in accordance with the user's desires. This may be accomplished either through preset values in the program stored in ROM or through communication between the installed meter and the remote accounting center wherein the information may be stored in the NVM 34 of the meter.

Figure 4:
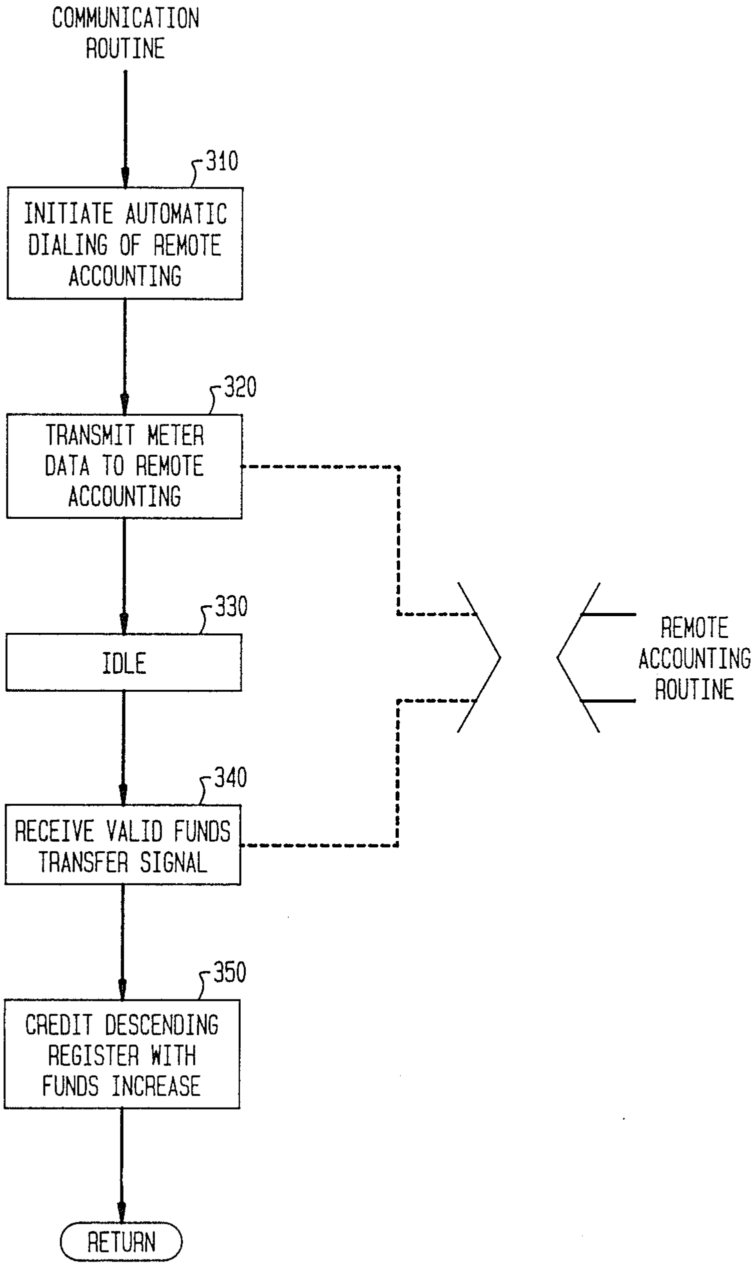
FIG. 4 is a flow chart of a communication routine for establishing communication between the postage meter and the remote accounting center.

If the threshold value has been reached the meter further checks in decision block 130 to determine if a predetermined time has been reached. If the time is appropriate, the communication routine shown as block 300 and described in conjunction with FIG. 4 is called and communication is established at port 46 through the telephone exchange to the remote accounting center 12. It will be appreciated that it is preferable that the calls which may be made to the remote accounting center be staggered in order that the center be able to accommodate the various postage meter stations. Accordingly the predetermined intervals may be preset in the permanent program memory or may be downloaded to the postage meter station at the initial communication between the postage meter and the remote accounting center.

If however the threshold value has not been reached, the threshold was reached and the time is not appropriate, or the threshold was reached and funds have been recredited to the meter, the program proceeds to block 140 which is a routine to set print wheel value (in conjunction with bloc5 48, FIG. 2). Typically the print wheels will remain set at the previously selected value since the majority of letters will probably require only the minimum postage. Known electronic postage meters conventionally use stepping motors for the purpose of setting the print wheels to a value commanded from a keyboard. The block 140 will also be understood to encompass the manual selection of printwheel positions through mechanical coupling between the setting means and the print wheels and the verification of each print wheel position.

At decision block 150 the value stored in the descending register is compared to a meter lockout value to determine for instance whether there are funds available for metering even though the predetermined recrediting threshold has been reached. If the meter lockout point has been reached the program branches to block 152 to display a message to the user, for example, "CALL CUSTOMER ASSISTANCE" or the like and program operation is suspended. When funds remain the program checks in decision block 160 to see if a postage printing has been commanded. If no printing has been initiated, the program loops back housekeeping, block 110. If a print cycle has been requested, the descending register is decremented and the ascending register is incremented as illustrated in blocks 170 and 180. The program moves to block 190 where the printer prints the selected postal value and the program returns to block 110.

FIG. 4 is a flow chart of a communication routine called by the postage meter program in the event that funds in the descending register have been decremented to the previously set threshold value. The routine 310 signals the DTMF transmitter-receiver 16 to dial the preselected telephone number of the remote accounting center 12 and establishes communication between the postage meter and the remote accounting center. It will be understood that various "handshaking" procedures are well known and may be utilized for establishing valid communication. Suitable protocols are described in U.S. Pat. No. 4,253,158 specifically incorporated herein by reference and in previously cited U.S. Pat. No. 4,097,923. As shown in block 320 the program falls to a transmit meter data information routine. It will be appreciated by those skilled in the art that all of the required meter data can be transmitted to the remote accounting center in a group of tone signals or the information may be transmitted piecemeal in response to queries from the computer in the remote accounting center.

The program then remains in an idle loop 330 until the register recrediting data is received at block 340. For best results the recrediting information transmitted by the remote accounting center to the postage meter must be encrypted to prevent fraudulent register updates being sent to the meter by unscrupulous parties. Accordingly, the block 340 also includes a routine for decrypting data that has been encrypted by the computer in the remote accounting center for transmission to the particular individual postage meter. A suitable encryption scheme is described for example in U.S. Pat.

No. 3,792,446 specifically incorporated herein by reference.

Upon assuring that the meter has received proper and authentic register recrediting information from the remote accounting center, the program performs the update of the descending register at block 350 and returns to the main program illustrated in FIG. 3.

Figure 5:
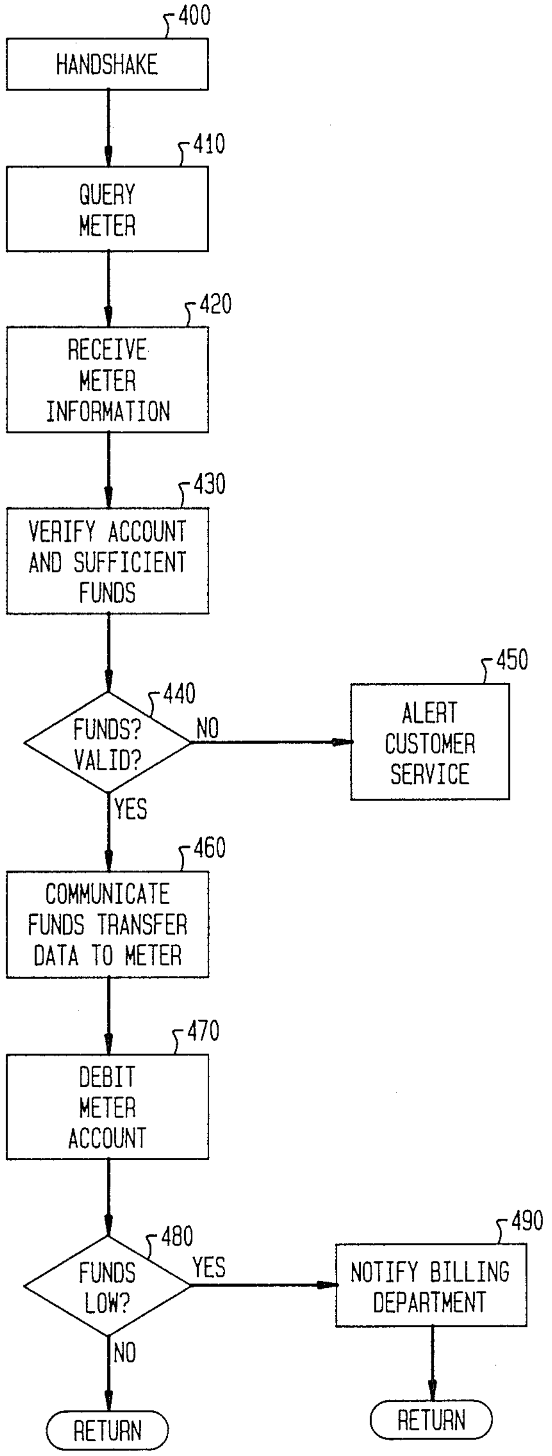
FIG. 5 is a flow chart of the operation of the equipment at the remote accounting station.

FIG. 5 is a flow chart illustrating the sequence of operations carried on at the remote accounting center upon communication being established between the postage meter and the accounting center. The instant routine is initiated by a telephone connection being established between the postage meter and the remote accounting center. As described previously in connection with FIG. 4, the counterpart "handshake" is achieved in block 400. Once the communication is established, the program falls to block 410 to request the meter to transmit meter data to the computer. The data to be transmitted includes at least the meter I.D. number and the values in the descending and ascending registers in the meter and is received, block 420.

The computer then proceeds to verify that the account is valid and that sufficient funds are available, block 430, and decision block 440. The remote accounting computer may suitably check, for example, the sum of the ascending and descending registers (the control sum) in order to ascertain that there has been no tampering with the contents of the registers during the period following the preceding communication. If funds are not available the program branches to block 450 to alert customer service that there are no funds for transfer to this particular meter, and program operation is suspended. Assuming that there are sufficient funds, register update information, preferably encrypted as described above, is transmitted to the meter via the telephone connection, block 460. The user's account is debited, block 470, and if the funds available have reached a predetermined threshold, level, decision block 480, customer billing is notified, block 490 predetermined and returns of if the funds remain above the threshold, operation returns directly to the main program.

It will be appreciated that the communication between the meter and the remote accounting center is not limited to the transfer of funds from the remote accounting center to the meter. For instance, the meter printer may be inoperative and the meter must be replaced or perhaps the user is moving the meter to a new location. If the meter has funds remaining in the descending register and if the meter electronics are otherwise operative, communication may be established as described in conjunction with FIGS. 4 and 5. The funds remaining in the descending register are communicated to the remote accounting center for recrediting the user's account and data is communicated to the meter to set the descending register of the meter to zero. This effectively takes the meter out of service. The meter can then be mailed to a service center for repair or be replaced by a new meter by mail. If the meter is simply being moved, it may be simply reinitialized at the new location.

Figure 6:
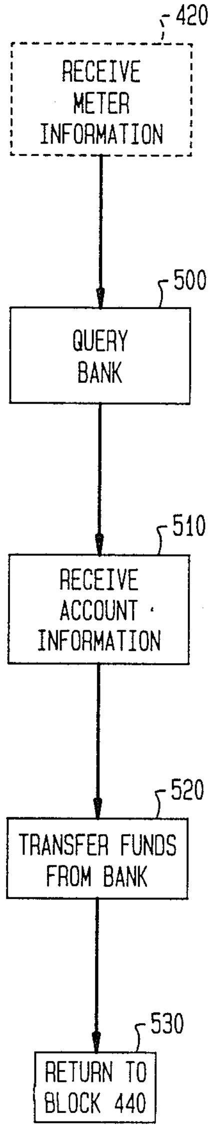
FIG. 6 is a flow chart of an alternate method of operation.

FIG. 6 shows an alternative method for maintaining the user's account. In accordance with this method the user's funds are maintained in a fund in a bank. Whenever the postage meter is to be recredited, the user's account is verified and the postage meter recrediting information is transmitted. The bank is then queried, block 500, and account information exchanged, block 510. The funds to cover the recrediting are transferred from the bank to the remote accounting center, block 520. The operating routine then returns at block 530 to enter the remote accounting center routine at block 440 illustrated at FIG. 5. The advantage of this arrangement is that the user's funds can be maintained in an interest bearing account instead of being tied-up in the account for directly funding the meter.

In a further feature in accordance with the invention, means may be specifically provided in order to enable synchronization between the clock of the remote accounting center and the postage meter so that the postage meter may be programmed to accept a call from the remote accounting center at a determined time of day.

For this purpose, in accordance with the invention, the internal clock of the postage meter may be set or reset in synchronism with a clock at the remote accounting center as an ancillary process during normal communication between the postage meter and remote accounting center, for example for a recharging cycle as discussed above. Alternatively, or in addition thereto, provision may be made for establishing communication between the postage meter and remote accounting center specifically for the purpose of ensuring the correct setting of the clock in the postage meter.

As an example, as illustrated in FIG. 4, the postage meter may also receive clock synchronization data, for synchronizing the postage meter clock, at the same time that it receives the valid funds transfer signals, at block 340. It is of course apparent that this reception may alternatively occur at and other desired time during the operation of the program of the postage meter. Similarly, referring to FIG. 5, the remote accounting center may transmit clock synchronization data to the meter during the process of communicating funds transfer data thereto, as indicated at block 450. Alternatively, of course, the clock synchronization data may be transferred at any other desired time during the operation of the remote accounting center operating program.

While the above described example illustrates the synchronization of the postage meter clock with that of the remote accounting center during a postage meter recharging cycle, it is also apparent that the programs of the postage meter and the remote accounting center may include provision for establishing the clock synchronization during any other communication therebetween.

In any event, under certain circumstances, it may be desirable for the remote accounting center to initiate contact with the postage meter. For example, the remote accounting center may include a routine for transferring postage table data to the postage meter, or for periodically establishing communication with the postage meter for the purpose of receiving register data or ensuring the continued location of the postage meter at a determined telephone number. In accordance with this aspect of the invention, the routines of the postage meter and the remote accounting center will include a specific time interval during which the postage meter will answer a ring signal on the telephone line. It will be appreciated that this interval may be made very short if the clocks are synchronized as previously described. This short interval is extremely important where the meter is sharing the telephone line used for normal telephone communication by the postage meter user. The routines of the accounting center and the postage meter may include provision for periodic repetition of a call and acceptance thereof at predetermined offsets of time in the event that communication is not established.

As further discussed above, the synchronization of the clocks of the postage meter and remote accounting center may comprise a separate routine. For example, the remote accounting center may include a routine for periodically establishing communication with the postage meter for the primary purpose of enabling synchronization between the clocks of the postage meter and the remote accounting center, such calls preferably again being effected during the night and being subject to repetition in the event of failure of communication. In addition, or alternatively, the postage meter or postage meter system may be provided with means for initiating a call to the remote accounting center for instituting a synchronization procedure for the clock of the postage meter. Thus, the user may orally request synchronization, or defined switches for this purpose may be provided on the postage meter itself. The synchronization procedure itself may be comprised solely of the transmission of correct clock data to the postage meter, or it may include variations thereof such as, for example only, the verification by the remote accounting center of the correct clock setting of the postage meter.

This application incorporates certain material common to certain other applications. The subject matter of all of these application, including the present case, are identified as follows by docket number and title: U.S. Ser. No. 850,479 POSTAGE METER RECHARGING SYSTEM, Ser. No. 850,478 POSTAGE METER COMMUNICATION SYSTEM, Ser. No. 850,477 POSTAGE METER RECHARGING SYSTEM, Ser. No. 850,480 POSTAGE METER MESSAGE PRINTING SYSTEM and Ser. No. 850,476 POSTAGE METER RECHARGING SYSTEM all filed concurrently herewith.

Other variations and modifications will be apparent to those skilled in the art.

What is claimed is:

1. A postage meter comprising:

(a) setting means for setting a postal value to be metered;

(b) printing means for printing the set postal value and control means for controlling and accounting for the printing of said set postal value;

(c) a descending register connected to said control means for receiving and storing a value representative of the funds remaining for metering and printing after accounting for the printing of said set postal value;

(d) a communication port;

(e) means for determining that the value in the descending register has reached a predetermined threshold value;

(f) communication-control means for automaticlly applying dialing signals and coded signals to said communication port whenever the determining means determines that the value stored in said descending register has reached said predetermined threshold value; and (g) means responsive to the receipt of predetermined coded signals at said communication port for recrediting the descending register.

2. The meter of claim 1 wherein the descending register is recredited only with a fixed increment of value.

3. The meter of claim 1 wherein the communication control means comprises a DTMF transmitter and receiver.

4. The meter of claim 1 wherein said predetermined threshold value is a selectable value.

5. The meter of claim 4 wherein the threshold value is selectable by the user of the meter.

6. The meter of claim 1 further comprising clock means, said clock means including means for setting said clock in response to coded signals at said communication port.

7. The meter of claim 6 wherein said communication control means accepts a communicated signal at said communication port at a time determined by signals from said clock means.

8. In a postage meter apparatus of the type having a printer and accounting means for accounting for postal value printed by the meter, said accounting means including a descending register for storing a value representative of funds remaining for metering, the improvement comprising:

(a) communication means for communication of information between a remote accounting means and control means for controlling the printer and accounting means;

(b) means for determining that the value in the descending register has reached a predetermined threshold value;

(c) communication-initiating means for automatically establishing communication between said control means and said remote accounting means whenever the determining means determines that the value stored in said descending register has reached said predetermined threshold value; and (d) means for automatically recrediting the descending register upon communication of recrediting information from the remote accounting means.

9. The postage meter of claim 8 wherein said communication means comprises a DTMF transmitter and receiver.

10. The postage meter of claim 8 further comprising clock means for providing time signals for establishing communication at determined times in respect of said signals.

11. A postage meter recharging system comprising:

(a) a postage metering apparatus including printing means for printing a postal value and control means for controlling and accounting for the printing of such postal value;

(b) said postage metering apparatus further including a descending register connected to said control means for receiving and storing a value representative of the funds remaining for dispensing and printing after accounting for the printing of postal value;

(c) a remote accounting means, said remote accounting means having an account maintained thereat of the funds available for recrediting the descending register of said postage metering apparatus;

(d) communication means for the communication of information between said remote accounting means and said postage metering apparatus;

(e) said postage metering apparatus further comprising:

(i) means for determining that the value in the descending register has reached a predetermined threshold value;

(ii) communication-initiating means for automatically establishing communication between said control means and said remote accounting means whenever the value stored in said descending register reaches said predetermined threshold value; and (iii) means for automatically recrediting the descending register upon communication of recrediting information from the remote accounting means; and (f) said remote accounting means, upon the establishment of communication, verifying the availability of funds for said postage metering apparatus and communicating recrediting information for recrediting the descending register of said postage metering apparatus.

12. The system of claim 11 wherein the descending register is recredited only with a fixed predetermined increment of value.

13. The system of claim 11 wherein the account at said remote accounting means has sufficient funds to allow a plurality of said fixed increments of value to be recredited.

14. The system of claim 11 wherein said remote accounting means debits said account upon the communication of said recrediting information.

15. The system of claim 11 wherein said communication means comprises a telephone communication means which includes automatic dialing means initiated whenever the value in the descending register reaches the predetermined threshold value.

16. The system of claim 15 wherein the telephone communication means includes voice transmission and receiving means for communication between a user of said postage metering apparatus and a customer service installation connected with said remote accounting means.

17. A method for adding funds to a postage meter of the type having at least a descending register for accounting for the postage which remains available for metering comprising the steps of:

(a) comparing the value stored in the descending register to a predetermined threshold value;

(b) automatically initiating a communication to a remote accounting means whenever the value of the descending register becomes less than or equal to said predetermined threshold value;

(c) determining if sufficient funds are available for crediting to said descending register from said accounting means; and (d) communicating register recharging information to said descending register when sufficient funds are available.

18. The method of claim 17 where the command to initiate a communication is stored until a time period where communication rates are dicounted at which time the communication is initiated.

19. In electronic postage meter having a clock, means connected to said clock for determining calendar dates and the time of the day, a communication port, and setting means connected to the determining means and said communication port, said setting means including means responsive to determined signals at said port for setting said clock in accordance with said signals.

20. A method for setting a clock in an electronic postage meter comprising deriving signals corresponding to current date and time at a remote accounting center, applying said signals to a communication path, receiving said signals at said meter, and setting said clock in accordance with said received signals.

* * * * *